June 6, 1961     L. J. LOVISEK     2,986,752
METHODS OF FORMING BY PUNCHING A CRUCIFORM
RECESS IN A HEADED FASTENER
Filed Sept. 23, 1958     2 Sheets-Sheet 1
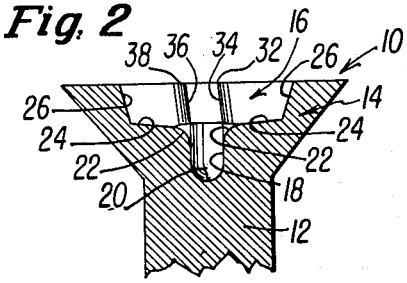
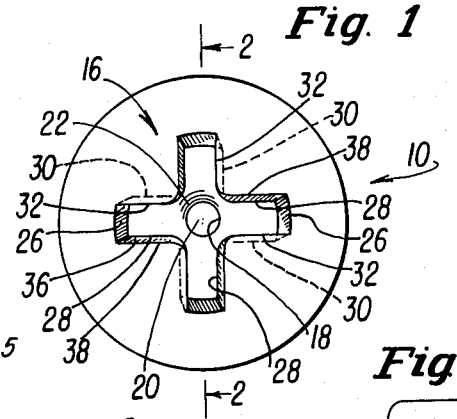
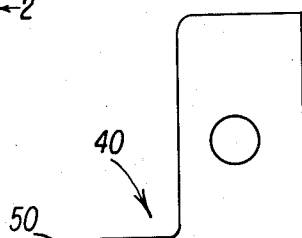
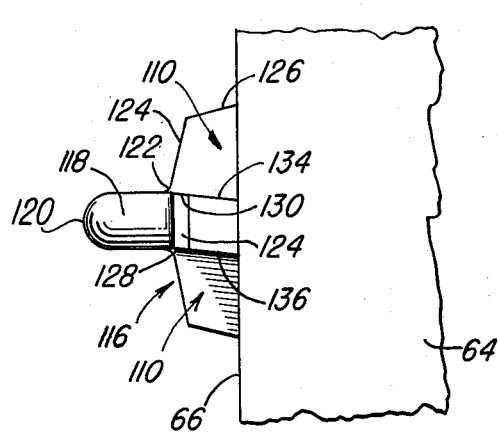
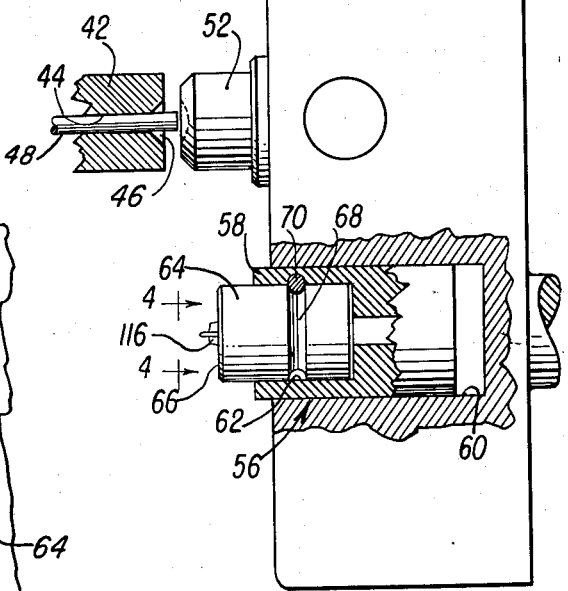
INVENTOR.
Louis J. Lovisek
BY
Attys.

United States Patent Office 2,986,752
Patented June 6, 1961

2,986,752
METHODS OF FORMING BY PUNCHING A CRUCIFORM RECESS IN A HEADED FASTENER
Louis J. Lovisek, Ridgewood, N.J., assignor to General American Transportation Corporation, Chicago, Ill., a corporation of New York
Filed Sept. 23, 1958, Ser. No. 762,765
4 Claims. (Cl. 10—27)

The present invention relates to method of shaping the heads of screw-threaded fasteners and of forming cruciform recesses therein, and more particularly to such method that is especially designed and arranged to effect the production of the heads of the screw-threaded fasteners disclosed in U.S. Patent No. 2,800,829, granted on June 20, 1957 to Maxwell A. West.

Although several methods have been suggested for manufacturing the screws of this West patent, no satisfactory production method has been heretofore devised.

More particularly, the recess in the head of the screw-threaded fastener disclosed in this West patent is in the form of a Greek cross comprising four radially extending arm-like slots arranged in substantially equal angularly spaced-apart relation, wherein each of the four slots includes leading and lagging faces, and the leading face thereof is inclined at a slight angle up to about 5° to the axis of the fastener so that the top of the leading face slightly overhangs the bottom thereof. The recess is adapted to receive the bit of a screw driver having a configuration conforming substantially to that of the recess and including four radially extending arm-like ribs arranged in substantially equal angularly spaced-apart relation, wherein each of the four ribs includes leading and lagging surfaces, and the leading surface thereof is inclined at the slight angle up to about 5° to the axis of the bit so that the outer end of the leading surface projects ahead of the inner end thereof by a slight amount in the driving direction. Thus the cruciform recess provided in the head of the screw-threaded fastener comprises the four slots including the four leading faces, serving as driving faces, adapted respectively to engage the four leading or driving surfaces of the cooperating bit in the driving operation. Also, the four slots include the four lagging faces, serving as guiding faces, adapted respectively to engage the four lagging surfaces of the cooperating bit incident to placement of the bit into the recess immediately preceding the driving operation.

In the preferred form of the cruciform recess in the head of the West screw-threaded fastener, the outer ends of the four radially extending slots are closed, whereby to render more difficult the withdrawal of any recess-forming tool that may be employed in producing the undercut portions of the slots of the recess. Now if this West screw is to perform its intended function and is to be operative in a satisfactory manner, the overhanging edges of the driving faces of the slots must be well-formed and not impaired in any way during or after the recess-forming operation mentioned.

Accordingly, it is a general object of the present invention to provide an improved method of shaping the head of a screw-threaded fastener and of forming therein a cruciform recess of the character noted, and particularly of making such a recess having radially directed slots provided with undercut portions thereof, thereby to produce strong and well-defined top edges on the driving faces of the slots provided in the head of the fastener.

Another object of the invention is to provide a method of producing cruciform recesses of the type described, that can be carried out employing a substantially conventional or standard screw-forming machine.

Still another object of the invention is to provide a method of forming in a screw head a cruciform recess of the type described, in which there is employed a tool including parts that form the undercut portions of the slots in the screw head, but do not displace or deform the adjacent overlying portions of the screw head that overhang the undercut portions of the slots, whereby to retain the strength and the desired shape of the overlying portions of the screw head.

Further features of the invention pertain to the particular arrangement of the steps of the method, whereby the above-outlined and additional operating features thereof are attained.

The invention, both as to its organization and method of operation, together with further objects and advantages thereof will best be understood by reference to the following specification taken in connection with the accompanying drawings, in which:

FIGURE 1 is an enlarged plan view of a flat head screw provided with a cruciform recess therein having undercut portions made by the machine and in accordance with the method of the present invention;

FIG. 2 is an enlarged fragmentary view in vertical section taken through the screw head, substantially as seen in the direction of the arrows along the line 2—2 in FIG. 1;

FIG. 3 is a view, with certain parts broken away and with other parts in section, of a punch block assembly incorporating therein the improved recess-forming apparatus of the present invention and that is employed in carrying out the method of the present invention;

FIG. 4 is an enlarged fragmentary end view of the recess punch forming a part of the punch block assembly, substantially as seen in the direction of the arrows along the line 4—4 in FIG. 3;

FIG. 5 is an enlarged fragmentary side elevational view of the recess punch, substantially as seen in the direction of the arrows along the line 5—5 in FIG. 4;

Figure 6:
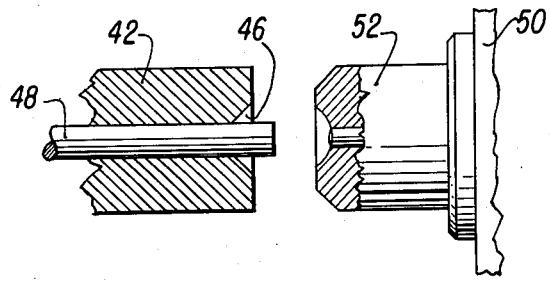
FIG. 6 is a fragmentary view, partly diagrammatic, showing the parts for performing the first blow on a length of wire in the formation of a cruciform recessed head.

Referring now to FIGS. 1 and 2 of the drawings, there is shown a screw 10 of the construction disclosed in the previously mentioned West patent that includes a shank 12 having formed on one end thereof a flat head 14. Also, there is formed on the outer face of the head 14 a cruciform recess 16. The recess 16 is illustrated as including four arm-like slots that are closed at the outer ends thereof, but it is to be understood that the invention is equally applicable to a recess including any desired number of arm-like slots and that the slots may be open-ended, if desired.

In the center of the recess 16 and disposed toward the lowermost portion thereof, there is provided a generally cylindrical pocket 18 which is adapted to receive a guiding tip or pilot member provided on a cooperating screw driver used in conjunction therewith, and while the pocket 18 is shown as being cylindrical and as having a rounded bottom 20, it is to be understood that the pocket 18 may have any suitable shape and the bottom 20 thereof may have a different configuration from that illustrated.

Extending upwardly from the pocket 18 are four rounded shoulders 22 which respectively join four generally horizontally disposed surfaces or bottom walls 24 which are inclined slightly downwardly toward the pocket 18. The outer ends of the four bottom walls 24 respectively join four upwardly inclined walls 26 which extend outwardly toward the rim of the screw 14 that closes the four outer ends of the four slots of the recess 16. As may be best seen in FIG. 1, each bottom wall 24 has a substantially parallel pairs of edges 28 and 30 which extend outwardly from the shoulder 22 to the adjacent upwardly and outwardly inclined wall 26.

The screw 10 is ordinarily driven or set by rotating it in a clockwise direction, as viewed in FIG. 1; whereby increased holding contact between the bit of the screw driver and the screw 10 is realized, as disclosed in the West patent, when the leading or driving faces of the outwardly extending slots of the recess 16 are undercut, provided that the bit of the cooperating screw driver is complementarily shaped. Improved performance also is obtained if the lagging faces of the slots are also inclined in the same direction as the leading faces thereof, whereby to guide the bit of the screw driver into the undercut leading faces of the slots mentioned. Accordingly, the upper leading edge 32 of each of the slots of the recess 18 is disposed counterclockwise from the bottom leading edge 30 thereof so that the wall 34 connecting the edges 30 and 32 is inclined at an angle up to about 5°, and preferably the inclination is in the range 2° to 5° to a median radial plane passing through the bottom of the slot. This inclination of the four driving faces 34 results in four outer portions of the screw head overlying the corresponding four undercut portions of the recess 16 which respectively lie adjacent to the four leading edges 30. Also, each lagging face 36 is preferably formed substantially parallel to the corresponding leading or driving face 34. Thus the four lagging faces 36 serve to guide the bit of the cooperating screw driver into engagement with the four driving faces 34. Accordingly, the upper edge 38 of each lagging face 36 is disposed in a counterclockwise direction with respect to the lower edge 28.

It is essential in forming the screw head 14 and the cruciform recess 16 therein that the leading edges 32 of the driving faces 34 be properly shaped, as illustrated in FIGS. 1 and 2, and that these edges are not weakened or impaired during the formation of the recess 16, and particularly during the formation of the undercut portions thereof along the edges 30, and also incident to the subsequent withdrawal of the recess-forming tool from the recess 16.

There is shown in FIGS. 3, 4 and 5 of the drawings apparatus for forming the head 14 having the cruciform recess 16 therein, in such a manner that the edges 32 are fully and carefully formed simultaneously with the formation of the recess 16, and without weakening or deforming of the edges 32 incident to the withdrawal of the forming tool. Referring first to FIG. 3 of the drawings, there is shown a punch block assembly generally designated by the numeral 40 that is adapted to operate as a part of a conventional screw heading machine. The heading machine also includes a wire support 42 adapted to hold a section of wire 48 that has been previously severed from a length of wire and from which a screw is to be formed. The support 42 has a cylindrical bore or aperture 44 therein to receive the wire section 48, the aperture 44 terminating in an outwardly flared frusto-conical recess 46 disposed toward the punch block assembly 40. As may be better seen in FIGS. 6 and 7 of the drawings, the support 42 holds or clamps a wire section 48 in proper position to cooperate with the punch block assembly 40 to form an upset head in the recess 46 and thereafter to hold or to clamp the headed wire section while the recess punch forms the recess 16 in the head thereof, and finishes the frusto-conical flat head of the resulting screw head 14.

Referring again to FIG. 3, there is shown a standard punch block 50 forming a part of the punch block assembly 40, the punch block 50 being of the type used in standard screw heading machines. Mounted on the punch block 50 is a standard first blow tool assembly 52 which, when driven against the end of a wire section 48, deforms the end thereof to provide a frusto-conical shaped portion 54 (see FIGS. 7 and 8). Movement of the first blow tool assembly 52 from the position shown in FIG. 6 to the position shown in FIG. 7 serves to form the head portion 54.

Mounted below the first tool assembly 52 is a recess punch assembly generally designated by the numeral 56. The recess punch assembly 56 includes a sleeve 58 cylindrical in form and disposed in a cylindrical opening 60 provided in the punch block 50. The usual clamping bolt (not shown) holds the sleeve 58 in a fixed operative position within the opening 60. The sleeve 58 is in turn provided with a cylindrical opening 62 therein which receives a cylindrical punch support 64. The outer end 66 of the punch support 64 carries in the center thereof a recess punch 116.

Referring now to FIGS. 4 and 5 of the drawings, the details of the recess punch 116 will be described. In general, the punch 116 is shaped complementary to the shape of the recess 16 in the screw head 14. More specifically, if the recess 16 has four outwardly extending slots, as illustrated in FIG. 1, the punch 116 is likewise provided with four outwardly extending ribs 110 which are separated by four flutes forming four lands. Each of the ribs 110 is provided with an outer surface 124 which corresponds to the bottom surface 24 of the recess 16. The surface 124 is slightly inclined, as is best seen in FIG. 5, and joins a fillet 122 which in turn joins a cylindrical portion 118. The cylindrical portion 118 terminates in a rounded end 120 and is adapted to form the pocket 18 having the rounded end 20 in the recess 16. The outer surface 124 of each of the ribs 110 joins a rearwardly and outwardly extending wall 126, as viewed in FIG. 5, the wall 126 terminating in the outer end 66 of the punch support 64.

Each of the ribs 110 has a pair of rearwardly extending flat surfaces 134 and 136, which as seen in FIG. 5, are inclined towards the outer end of the punch support 64, the surfaces 134 and 136 respectively comprising leading and lagging surfaces. On each rib 110 the leading surface 134 is inclined to the axis of the recess punch 116 at an angle up to about 5°, and preferably the inclination is in the range 2° to 5° to a median radial plane passing through the outer surface 124 of the rib 110. Also each lagging surface 136 is preferably formed substantially parallel to the corresponding leading surface 134. The four leading surfaces 134 and the four lagging surfaces 136 on the four ribs 110 serve to form the four leading faces 34 and the four trailing faces 36, respectively, of the four slots of the recess 16. Similarly, the lower edges 28 and 30 of each of the slots of the recess 16 are formed against the edges 128 and 130, respectively, on the recess punch 116. In each of the ribs 110, the marginal edges 128, 130, 132 and 138 are all substantially parallel to the median radial plane passing through the outer surface 124 thereof.

The material of the wire section 48 may be a metal, such as steel, and particularly the metal in the partially formed head portion 54, is sufficiently malleable so that it can flow around and along the surfaces 134 of the ribs 110 to fill the areas between the surfaces 134 and the outer end 66 of the punch support 64 whereby to form the overlying edge 34 of the head 14 at the intersection of the surface 134 and the outer end 66 of the punch support 64. It can be readily seen from FIG. 5 that any attempt to withdraw the recess punch 116 directly outwardly would tear away any material lying in the path of axial withdrawal movement of the leading surface 134 and thus destroy the edge 32 on the head 14. The destruction of this overlying edge 32 would completely defeat the purpose of the undercuts in the slots in the recess 16 in the screw head 14, since there would be no interlocking with a tool shaped complementarily to the recess 16.

Accordingly, an important feature of the present invention is to provide a structure for the recess punch 116 such that it can be easily turned by engagement with the newly formed faces 34 to permit withdrawal of the punch 116 without destroying the edges 32. To this end the punch support 64 is provided with a circumferentially extending groove 68, the groove 68 being approximately semi-circular in cross section. A straight pin 70 is disposed in the punch support 64 and projects into the groove 68, whereby to hold the punch support 64 against movement axially and yet permit rotation thereof about the longitudinal axis thereof. This mounting arrangement permits the punch support 64 and the associated recess punch 116 to be rotated the necessary amount during withdrawal of the recess punch 116 from the newly formed recess 16 in the screw head 14. This rotation of the recess punch 116 and the associated punch support 64 permits the overlying edges 32 of the newly formed recess 16 to push against the surfaces 134 of the recess punch 116 thereby shifting the surfaces 134 and the punch 116 to clear the edges 32. In actual practice it is believed that the entire area of each of the leading faces 34 aids in applying this rotative force to the recess punch 116 and the associated punch support 64, whereby to rotate these members with respect to the stationary sleeve 58 the amount necessary to permit clearance between the recess punch 116 and the edges 32 without destruction or deformation thereof.

Figure 7:
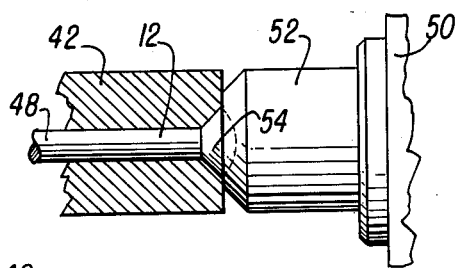
FIG. 7 is a view showing the parts of FIG. 6 in the position assumed after the first blow.

Referring now to FIGS. 6 through 9 of the drawings, the method of forming the head 14 having a cruciform recess 16 therein on a wire section 48 will be described in detail. A cut wire section 48 is provided and is fed into the wire support 42 of the heading machine. The wire section 48 is positioned as illustrated in FIG. 6 with the right hand end thereof extending outwardly beyond the support 42. The punch block 50 is then shifted (by mechanism not shown) to place the first blow tool assembly 52 in the position illustrated in FIG. 6. Thereafter, the drive mechanism for the punch block 50 moves the punch block 50 carrying the assembly 52 axially to the position illustrated in FIG. 7 with sufficient force to form the head portion 54.

Figure 8:
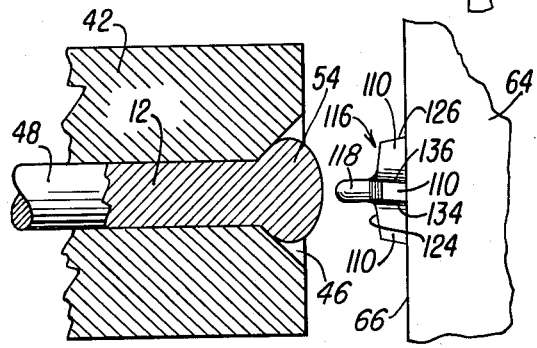
FIG. 8 is a fragmentary view on an enlarged scale showing the recess punch in position to operate upon the headed blank resulting from the first blow.
Figure 9:
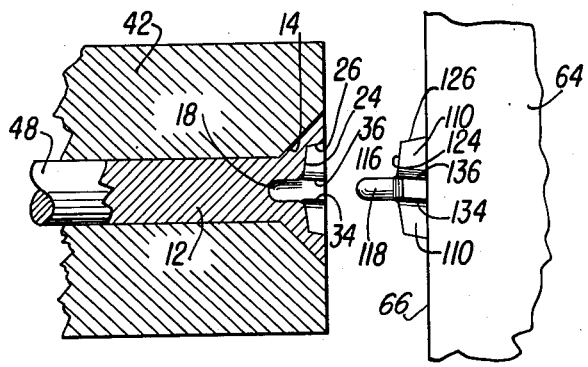
FIG. 9 is a view of the parts of FIG. 8 after formation of the cruciform recess in the headed blank.

Thereafter, the punch block 50 is retracted axially by the driving mechanism and then moved laterally into a position to align axially the recess punch 116 and the head portion 54, this position being illustrated in FIG. 8 of the drawings; which position is in substantial axial alignment with the desired recess 16 in the head portion 54 and centered with respect to the axis of the wire section 48. Next, the drive mechanism for the punch block 50 moves the recess punch 116 axially in order to advance the same into the head portion 54 of the fastener to form the recess 16 therein. The punch block 50 is then retracted axially by the drive mechanism to place the parts in the position illustrated in FIG. 9. During the retraction of the punch block 50, the leading faces 34 and the edges 32 on the recess 16 in the newly formed screw head 14 act against the leading surfaces 134 on the recess punch 116 to rotate the recess punch 116 and its associated support in the counter direction to the drive direction of the screw and through the necessary angle to clear the edges 32. Next, the punch block 50 is shifted and the headed member is discharged from the support 42 for feeding to a subsequent screw forming apparatus. A new wire section 48 is then inserted into the support 42 and the punch block 50 moves so that the first blow assembly 52 is in axial alignment therewith, as illustrated in FIG. 6. The machine is now in readiness to repeat the head forming operation described above.

It has been found that the recess punch 116 does not rotate while it is forming the recess 16 in the head 14. This is believed to result from the friction between the rear of the punch support 64 and the sleeve 58, this frictional resistance being greater than the turning force of the flowing metal in the head of the block 54. During axial withdrawal of the recess punch 116, it is rotated in a clockwise direction, as viewed in FIG. 4; which rotation is in the direction counter to the drive direction of the screw head 14, and which rotation is through an angle about the longitudinal axis of the screw head 14 that is adequate to clear the edges 32 of the slots of the recess 16 in the screw head 14, as previously explained. Of course, the angle of rotation mentioned is dependent upon the depth of the slots of the recess 16 and the angle of inclination of the driving faces 34 to the median radial planes passing through the bottom of the respective slots of the recess 16, as will be immediately apparent. Accordingly, the recess punch 116 and the punch support 64 are rotated through the required angle mentioned about the longitudinal axis of the punch support 64 and with respect to the sleeve 58 that is frictionally secured in a fixed position in the opening 60 formed in the punch block 50. Of course, successive operations of the punch block 50 to form successive screw heads 14 effect successive steps of rotation of the recess punch 16 and the punch support 64, as explained above; however, this mode of operation is of no consequence in the production of the successive recesses 16 in the successive screw heads 14, since each recess 16 is altogether symmetrical with respect to the screw head 14.

In view of the foregoing, it is apparent that there have been provided improved methods of making cruciform recesses in the heads of screw-threaded fasteners, and particularly such methods that are especially designed and arranged to effect the production of the heads of screw-threaded fasteners disclosed in the West patent.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of shaping the head of a screw-threaded fastener and of forming therein a cruciform recess that includes a number of radially extending arm-like slots arranged in substantially equal angularly spaced-apart relation, wherein each of said slots includes leading and lagging faces and the leading face thereof is inclined at a slight angle up to about 5° to the axis of said fastener so that the top of the leading face slightly overhangs the bottom thereof; said method comprising providing a metal fastener blank having an enlarged end, providing a first die having a first head-forming surface on the outer end thereof, providing a second die having a second head-forming surface on the outer end thereof and carrying a forwardly projecting punch surrounded by said second head-forming surface, said punch having a configuration conforming substantially to that of said cruciform recess and including said number of radially extending arm-like ribs arranged in substantially equal angularly spaced-apart relation, wherein each of said ribs includes leading and lagging surfaces and the leading surface thereof is inclined at said slight angle to the axis of said punch so that the outer end of the leading surface projects slightly forwardly of the inner end thereof, rigidly supporting said fastener blank in said first die with said enlarged end thereof adjacent to said first head-forming surface, supporting said dies in alignment with each other so that said punch is disposed in axial alignment with said supported fastener blank and so that said second die is mounted only for rotation about the axis of said punch and for movements along the axis of said punch toward and away from the enlarged end of said supported fastener blank, advancing said second die along the axis of said punch toward said first die while restraining said second die against rotation about the axis of said punch and sufficiently simultaneously to cause said first and second head-forming surfaces to shape the enlarged end of said supported fastener blank into the head of said fastener and to cause said punch to form said cruciform recess in the head of said fastener with the flow of the metal of the head of said fastener into respective engagements with the leading surfaces of said ribs and with the outer ends of the leading surfaces of said ribs respectively disposed at the bottoms of the leading surfaces of said slots, and retracting said second die along the axis of said punch away from said first die so as to withdraw said punch axially from said cruciform recess thus formed in the head of said fastener while simultaneously rotating said second die about the axis of said punch in the lagging direction through a small angle by respective sliding engagements of the leading faces of said slots with the leading surfaces of said ribs, wherein said small angle is adequate to prevent the leading surfaces of said ribs from damaging the leading faces of said slots incident to withdrawal of said punch from said cruciform recess.

2. The method set forth in claim 1, wherein said slight angle is in the range 2° to 5°.

3. The method of shaping the head of a screw-threaded fastener and of forming therein a cruciform recess that includes a number of radially extending arm-like slots arranged in substantially equal angularly spaced-apart relation, wherein each of said slots includes leading and lagging faces and the leading face thereof is inclined at a slight angle up to about 5° to the axis of said fastener so that the top of the leading face slightly overhangs the bottom thereof; said method comprising providing a metal fastener blank having an enlarged end, providing a first die having a first head-forming surface on the outer end thereof, providing a second die having a second head-forming surface on the outer end thereof and carrying a forwardly projecting punch surrounded by said second head-forming surface, said punch having a configuration conforming substantially to that of said cruciform recess and including said number of radially extending arm-like ribs arranged in substantially equal angularly spaced-apart relation, wherein each of said ribs includes leading and lagging surfaces and the leading surface thereof is inclined at said slight angle to the axis of said punch so that the outer end of the leading surface projects slightly forwardly of the inner end thereof, rigidly supporting said fastener blank in said first die with said enlarged end thereof adjacent to said first head-forming surface, supporting said dies in alignment with each other so that said punch is disposed in axial alignment with said supported fastener blank and so that said second die is mounted only for rotation about the axis of said punch and for movements along the axis of said punch toward and away from the enlarged end of said supported fastener blank, moving said second die along the axis of said punch toward said first die to position said punch in close proximity with respect to the enlarged end of said supported fastener blank, striking said second die a sharp blow in order to advance the same along the axis of said punch into engagement with said first die while restraining said second die against rotation about the axis of said punch and so as simultaneously to cause said first and second head-forming surfaces to shape the enlarged end of said supported fastener blank into the head of said fastener and to cause said punch to form said cruciform recess in the head of said fastener, with the flow of the metal of the head of said fastener into respective engagements with the leading surfaces of said ribs and with the outer ends of the leading surfaces of said ribs respectively disposed at the bottoms of the leading surfaces of said slots, and retracting said second die along the axis of said punch from engagement with said first die so as to withdraw said punch axially from said cruciform recess thus formed in the head of said fastener while simultaneously rotating said second die about the axis of said punch in the lagging direction through a small angle by respective sliding engagements of the leading faces of said slots with the leading surfaces of said ribs, wherein said small angle is adequate to prevent the leading surfaces of said ribs from damaging the leading faces of said slots incident to withdrawal of said punch from said cruciform recess.

4. The method of shaping the head of a screw-threaded fastener of the flat-head type and of forming therein a cruciform recess that includes a number of radially extending arm-like slots arranged in substantially equal angularly spaced-apart relation, wherein each of said slots includes leading and lagging faces and the leading face thereof is inclined at a slight angle up to about 5° to the axis of said fastener so that the top of the leading face slightly overhangs the bottom thereof, said method comprising providing a metal fastener blank having an enlarged end, providing a first hollow die having a head-forming conical-shaped recess in the outer end thereof, providing a second die having a head-forming flat surface on the outer end thereof and carrying a forwardly projecting punch surrounded by said head-forming surface, said punch having a configuration conforming substantially to that of said cruciform recess and including said number of radially extending arm-like ribs arranged in substantially equal angularly spaced-apart relation, wherein each of said ribs includes leading and lagging surfaces and the leading surface thereof is inclined at said slight angle to the axis of said punch so that the outer end of the leading surface projects slightly forwardly of the inner end thereof, rigidly supporting said fastener blank in said first die with said enlarged end thereof in said head-forming recess, supporting said dies in alignment with each other so that said punch is disposed in axial alignment with said supported fastener blank and so that said second die is mounted only for rotation about the axis of said punch and for movements along the axis of said punch toward and away from the enlarged end of said supported fastener blank, advancing said second die along the axis of said punch into engagement with said first die while restraining said second die against rotation about the axis of said punch and so as simultaneously to cause said head-forming recess and said head-forming surface to shape the enlarged end of said supported fastener blank into the head of said fastener and to cause said punch to form said cruciform recess in the head of said fastener with the flow of the metal of the head of said fastener into respective engagements with the leading surfaces of said ribs and with the outer ends of the leading surfaces of said ribs respectively disposed at the bottoms of the leading surfaces of said slots, and retracting said second die along the axis of said punch from engagement with said first die so as to withdraw said punch axially from said cruciform recess thus formed in the head of said fastener while simultaneously rotating said second die about the axis of said punch in the lagging direction through a small angle by respective sliding engagements of the leading faces of said slots with the leading surfaces of said ribs, wherein said small angle is adequate to prevent the leading surfaces of said ribs from damaging the leading faces of said slots incident to withdrawal of said punch from said cruciform recess.

References Cited in the file of this patent

UNITED STATES PATENTS

| | | |
|---|---|---|
| 1,328,077 | Boyer | Jan. 13, 1920 |
| 2,082,085 | Tomalis | June 1, 1937 |
| 2,800,829 | West | July 30, 1957 |